(12) United States Patent
Sabharwal et al.

(10) Patent No.: US 11,683,379 B2
(45) Date of Patent: Jun. 20, 2023

(54) EFFICIENT MESSAGE TRANSMISSION AND LOOP AVOIDANCE IN AN RPL NETWORK

(71) Applicant: Landis+Gyr Innovations, Inc., Alpharetta, GA (US)

(72) Inventors: Ankush Sabharwal, New Delhi (IN); Saurabh Jain, Ghaziabad (IN); Shobhit Kumar Singh, Ghaziabad (IN)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 369 days.

(21) Appl. No.: 16/385,487

(22) Filed: Apr. 16, 2019

(65) Prior Publication Data
US 2020/0336547 A1    Oct. 22, 2020

(51) Int. Cl.
| | | |
|---|---|---|
| *H04L 67/14* | (2022.01) | |
| *H04L 41/0823* | (2022.01) | |
| *H04L 41/12* | (2022.01) | |
| *H04L 101/659* | (2022.01) | |

(52) U.S. Cl.
CPC .......... *H04L 67/14* (2013.01); *H04L 41/0836* (2013.01); *H04L 41/12* (2013.01); *H04L 2101/659* (2022.05)

(58) Field of Classification Search
CPC ....................................................... H04L 41/12
See application file for complete search history.

(56) References Cited

U.S. PATENT DOCUMENTS

| | | | |
|---|---|---|---|
| 2013/0191688 A1* | 7/2013 | Agarwal | H04L 41/12 |
| | | | 714/E11.178 |
| 2017/0207967 A1* | 7/2017 | Thubert | H04L 45/22 |

FOREIGN PATENT DOCUMENTS

| | | |
|---|---|---|
| EP | 3244574 | 11/2017 |

OTHER PUBLICATIONS

Winter et al. "RFC 6550: RPL: IPv6 Routing Protocol for Low-Power and Lossy Networks", Internet Engineering Task Force, Mar. 2012. (Year: 2012).*

Narten et al. "RFC 4861: Neighbor Discovery for IP version 6 (IPv6)", Internet Engineering Task Force, Sep. 2007. (Year: 2007).*

(Continued)

*Primary Examiner* — Nicholas P Celani
(74) *Attorney, Agent, or Firm* — Kilpatrick Townsend & Stockton LLP

(57) ABSTRACT

In some implementations, formation of loops between nodes in an RPL network may be avoided. A node that receives a neighbor-discovery message may determine, based on a parent-child status, whether the neighbor-discovery message was received from a parent of the node. If the neighbor-discovery message was received from the parent, the node may transmit an error code to the parent. In addition, the node may determine, based on a comparison of reliability rankings, whether the neighbor-discovery message was received from a node with relatively high reliability, such as a potential grandparent node. If the neighbor-discovery message was received from a high-reliability node, the node may transmit an error code to the high-reliability node. Furthermore, the node may reduce network traffic by withholding a neighbor-detection message from a child node. The node may transmit a response to neighbor-detection messages received from the child node.

6 Claims, 9 Drawing Sheets

(56) References Cited

OTHER PUBLICATIONS

International Patent Application No. PCT/US2020/027353, International Search Report and Written Opinion dated Aug. 12, 2020, 17 pages.
International Patent Application No. PCT/US2020/027353, Partial Search Report and Invitation to Pay Additional Fees, dated Jun. 22, 2020, 10 pages.
Narten et al., Neighbor Discovery for IP Version 6 (IPv6), Standard RFC 4861, Sep. 2007, pp. 1-97.
Shelby et al., Neighbor Discovery Optimization for IPv6 Over Low-Power Wireless Personal Area Networks (6LoWPANs), Standard RFC 6775, Nov. 2012, pp. 1-55.
Winter et al., RPL: IPv6 Routing Protocol for Low-Power and Lossy Networks, Standard RFC 6550, Mar. 2012, pp. 1-157.

* cited by examiner

EFFICIENT MESSAGE TRANSMISSION AND LOOP AVOIDANCE IN AN RPL NETWORK

TECHNICAL FIELD

This disclosure relates generally to the field of neighbor-discovery protocols in computer networks, and more specifically relates to establishing neighbor relationships between nodes in a computer network.

BACKGROUND

A computer network may include one or more computing devices, or nodes, that communicate with other nodes in the computer network. In some cases, the computer network may implement a routing protocol for low-power and lossy networks ("RPL network"). In some cases, the RPL network may include one or more devices operating on a limited power supply (such as a battery), one or more devices operating on a stable power supply (such as an electrical connection to grid power), or devices using a combination of limited or stable power supplies. An RPL network may include multiple nodes that transmit and receive messages, such as a message including a packet. A node included in an RPL network may transmit and receive messages with neighboring nodes in the network, such as nodes that have a direct communication path with the particular node. For example, the node may transmit or receive messages to discover which nodes are neighbors with the particular node. In addition, the node may transmit or receive messages to test a reliability of communication paths with neighboring nodes.

In some cases, the node may transmit routed messages between additional nodes, such as by relaying a message that is intended to be received by an additional node in the RPL network. The routed messages may be transmitted based on parent-child relationships between nodes, such that parent nodes route messages to (or from) their child nodes and child nodes route messages to (or from) their parent node. The RPL network may efficiently transmit messages through the network based on efficient routes. An efficient route may include more reliable nodes establishing parent relationships, and less reliable nodes establishing non-parent neighbor relationships (such as a child relationship). In addition, an efficient route may avoid loops, such as a node establishing a child relationship with its own child node (or grandchild node). In some cases, an inefficient route may cause additional messages, such as repeat messages related to lost packets or messages that are routed through a high number of nodes.

Transmitting or receiving messages may cause a node to consume power, such as power related to generating a message for transmission, routing a message, interpreting a received message, or using a communications antenna. In an RPL network, transmitting and receiving messages may cause nodes to consume a limited power supply (such as by draining a battery), and may reduce the lifespan of a node. A node that has consumed its power supply may be unable to transmit additional messages, and may reduce the capacity of the RPL network to carry messages. To improve the capacity of an RPL network, it is desirable to reduce a number of messages transmitted by nodes in the RPL network. In addition, it is desirable to establish efficient routes in the RPL network, including routes that avoid loops.

SUMMARY

According to certain implementations, a first node in an RPL network may establish a first neighbor relationship with a second node and a second neighbor relationship with a third node. The first neighbor relationship may indicate a parent status of the first node and a child status of the second node. The second neighbor relationship may indicate a child status of the first node and a parent status of the third node. The first node may transmit a neighbor-detection message to the third node based on the parent status of the third node, and withhold the neighbor-detection message from being transmitted to the second node based on the child status of the second node.

In some implementations, a first node in an RPL network may have a neighbor relationship with a second node in the RPL network. The neighbor relationship may indicate a parent status of the second node and a child status of the first node. The first node may receive from the second node a neighbor-discovery message indicating a requested modification to the neighbor relationship. Based on the neighbor relationship, the first node may determine that the second node has the parent status. Responsive to determining the parent status of the second node, the first node may transmit to the second node a response including an error code indicating that the requested modification is unavailable.

In some implementations, a first node in an RPL network may transmit a first neighbor-discovery message to multiple additional nodes. The first node may receive responses indicating respective transmission metrics and a respective ranking of each responding node. Based on the transmission metrics, the first node may determine a first ranking indicating a reliability of a communication path of the first node. The first node may receive, from a second node in the RPL network, a second neighbor-discovery message indicating a second ranking of the second node. Based on the first and second rankings, the first node may determine that the second node has a higher reliability than the first node. Responsive to determining that the second node has the higher reliability, the first node may transmit to the second node a response including an error code.

These illustrative implementations are mentioned not to limit or define the disclosure, but to provide examples to aid understanding thereof. Additional implementations are discussed in the Detailed Description, and further description is provided there.

BRIEF DESCRIPTION OF THE DRAWINGS

Features, implementations, and advantages of the present disclosure are better understood when the following Detailed Description is read with reference to the accompanying drawings, where:

FIG. 1, including

DETAILED DESCRIPTION

Figure 1B:
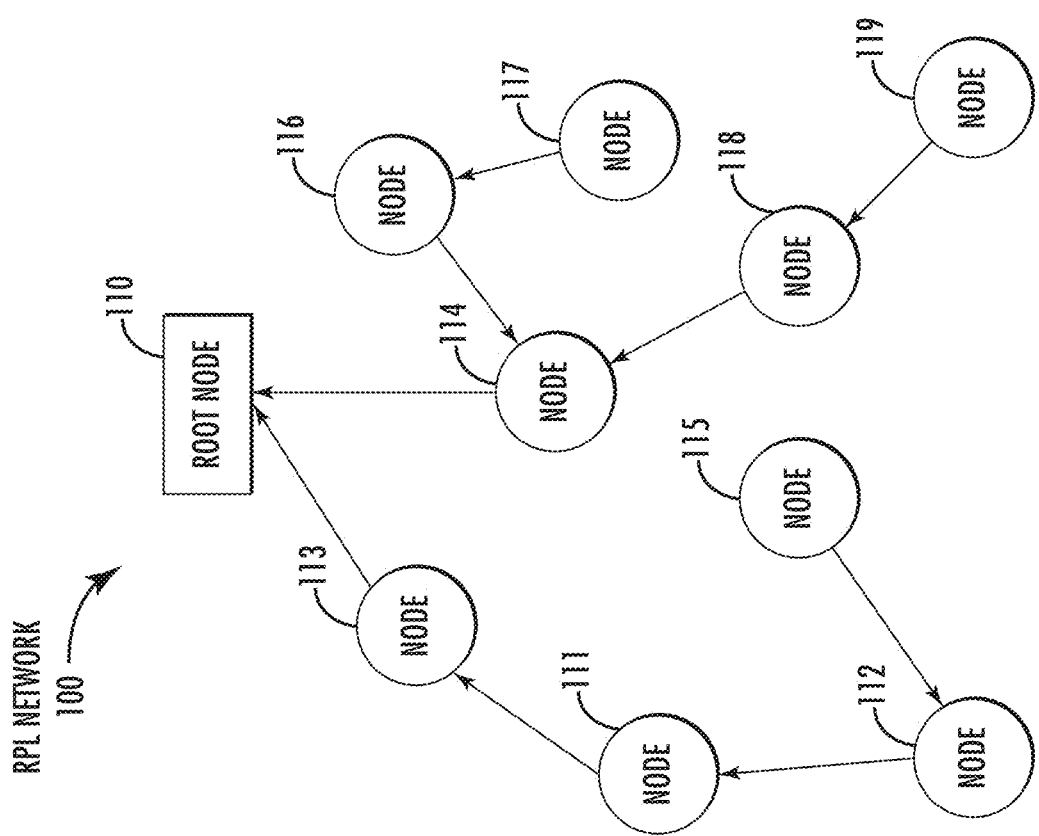
FIG. 1a and FIG. 1b, is a block diagram depicting an example of an RPL network that includes multiple nodes, according to certain implementations.

As discussed above, power consumption of one or more nodes in an RPL network may be improved by reducing a number of messages transmitted between the nodes. Certain implementations described herein provide techniques to reduce a quantity of messages that are related to a neighbor discovery protocol implemented within an RPL network, such as by reducing neighbor-discovery messages or neighbor-detection messages. For example, a first node in an RPL network may transmit a neighbor-discovery message to multiple additional nodes in the RPL network, such as to discover which nodes have or can establish a direct communication path (e.g., are neighbors) with the first node. Based on one or more responses received from the additional nodes, the first node may establish neighbor relationships with respect to the additional nodes, such as neighbor relationships indicating a parent or child status. A second node may be indicated as a child of the first node, and a third node may be indicated as a parent of the first node.

In some implementations, the first node may transmit one or more neighbor-detection messages. For example, neighbor-detection messages may be transmitted to test communication paths between neighboring nodes. The first node may transmit a neighbor-detection message to a parent node, such as to detect a reliability of the communication path with the parent node. In some cases, the first node may withhold the neighbor-detection message from being transmitted to the child node. In addition, the first node may respond to a neighbor-detection message that is received from the child node. In the RPL network, neighbor-detection messages may be transmitted by child nodes, and not by parent nodes. In addition, parent nodes may respond to the neighbor-detection messages from the child nodes. As the parent nodes may not send neighbor-detection messages to the child nodes, the child nodes do not transmit responses. Therefore, the overall number of neighbor-detection messages, and responses to neighbor-detection messages, that are transmitted on the RPL network may be reduced.

In some implementations, a particular node on the RPL network may be seeking a parent node. For example, the particular node may be joining the RPL network as a new node, or a communication path between the particular node and a previous parent node may become unreliable. The particular node may transmit a neighbor-discovery message to its neighbor nodes to establish a new parent node. In some cases, the neighbor nodes may transmit a response to the neighbor-discovery message based on a relationship with the particular node. For example, if the particular node transmits a neighbor-discovery message to its child node, the child node may determine that the particular node is its own parent node. The child node may send a response with an error code, based on the determination that the particular node is its parent node. Responsive to receiving the error code, the particular node may establish a parent-child relationship with an additional node in the RPL network, such that the additional node is a new parent of the particular node. Therefore, the RPL network may avoid loops in routes between nodes.

As used herein, the term "RPL network" may refer to a computer network that implements a routing protocol for low-power and lossy computer networks. An RPL network may, but need not, be a low-power and lossy computer network. In some cases, an RPL network may include one or more nodes that typically operate with constraints on one or more of processing power, memory, or energy, such as computing devices that operate on battery power. In addition, an RPL network may include one or more nodes characterized by one or more of high loss rates of data messages (e.g., lost packets), low data rates, or instability of communication paths between nodes on the computer network.

In an RPL network, the routing protocol may establish one or more routes between nodes that are included in the RPL network. In addition, the RPL network may establish routes based on neighbor-discovery processes performed by one or more of the nodes on the RPL network. In some cases, an RPL network may implement neighbor-discovery according to one or more standards, such as a standard RFC 4861 for "Neighbor Discovery for IP version 6 (IPv6)" or a standard RFC 6775 for "Neighbor Discovery Optimization for IPv6 over Low-Power Wireless Personal Area Networks (6LoWPANs)." In some cases, an RPL network may implement a routing protocol according to one or more standards, such as a standard RFC 6550 for "RPL: IPv6 Routing Protocol for Low-Power and Lossy Networks."

As used herein, the term "node" may refer to a computing device that is configured to receive or transmit messages in a computer network. A node may include, without limitation, a router, a gateway, an endpoint, a collector, or any other suitable type of computing device. In some cases, a node may be a virtual node, such as a node that is implemented as a software-based computing device (e.g., a cloud computing network, a virtual server).

As used herein, the term "neighbor discovery" may refer to one or more operations performed by a node to determine one or more neighboring nodes in an RPL network. Neighbor discovery may include transmission of one or more neighbor-discovery messages, such as a neighbor solicitation or a neighbor advertisement. In addition, neighbor discovery may include transmission of a particular neighbor-discovery message to multiple receiving nodes, such as a multicast message identified as being directed to any node capable of receiving the multicast message. Nodes may be neighbors with respect to each other if there is a communication path between the nodes, such that each node may transmit a message to the other without routing the message through an additional node. In some cases, neighbor discovery may be performed by a node that is joining (or re-joining) an RPL network. In addition, neighbor discovery may be performed by a node that is included in an RPL network. For example, a node that already has one or more neighbors may perform neighbor discovery to determine if any additional nodes are available as additional neighbors.

As used herein, the term "neighbor detection" may refer to one or more operations performed by a node included in an RPL network to determine if a neighboring node is reliable. In some cases, neighbor detection includes a process for neighbor unreachability detection ("NUD"), such as a NUD process described by the standard RFC 4861 for "Neighbor Discovery for IP version 6 (IPv6)." Neighbor detection may include transmission of one or more neighbor-detection messages, such as a neighbor solicitation or a neighbor advertisement. In addition, neighbor detection may include transmission of a particular neighbor-detection message to a particular receiving node, such as a unicast message identified as being directed to the particular node. A node may perform neighbor detection during other communications with a neighbor, such as by transmitting a neighbor-detection message along with additional messages for the neighbor. In addition, a node may perform neighbor detection responsive to determining that the neighbor may be unreliable, such as a neighbor that does not respond to messages.

As used herein, the term "message" and "data message" may refer to a group of one or more data packets that is configured to be transmitted between nodes, such as nodes in an RPL network. A message may include information, such as information about a node that transmits the packet (e.g., performance information for the transmitting node), information from an additional computing system (e.g., a computing system external to the RPL network), or any other suitable information.

As used herein, the term "communication path" may refer to a link between nodes such that the nodes are capable of transmitting and receiving messages via the communication path. A communication path may be established via any suitable communication technique between nodes, such as a wired technique (e.g., network cable) or a wireless technique (e.g., Wi-Fi, Bluetooth, cellular modem), or a combination of wired and wireless techniques.

As used herein, the terms "route" and "routing" may refer to a message that is transmitted from an originating node to a recipient node via one or more additional nodes. For example, a routing node may receive a message that is intended for a recipient node other than the routing node. The routing node may transmit the message to the recipient node or to an additional routing node. In some cases, a route may be determined based on a routing protocol. In addition, a route may be modified based on information about nodes included in the route. For example, if a routing node determines that it has lost a connection to its parent node, the routing node may use neighbor discovery operations to determine a new parent. In addition, any routes to which the routing node belongs may be modified based on the new parent of the routing node.

Figure 1A:
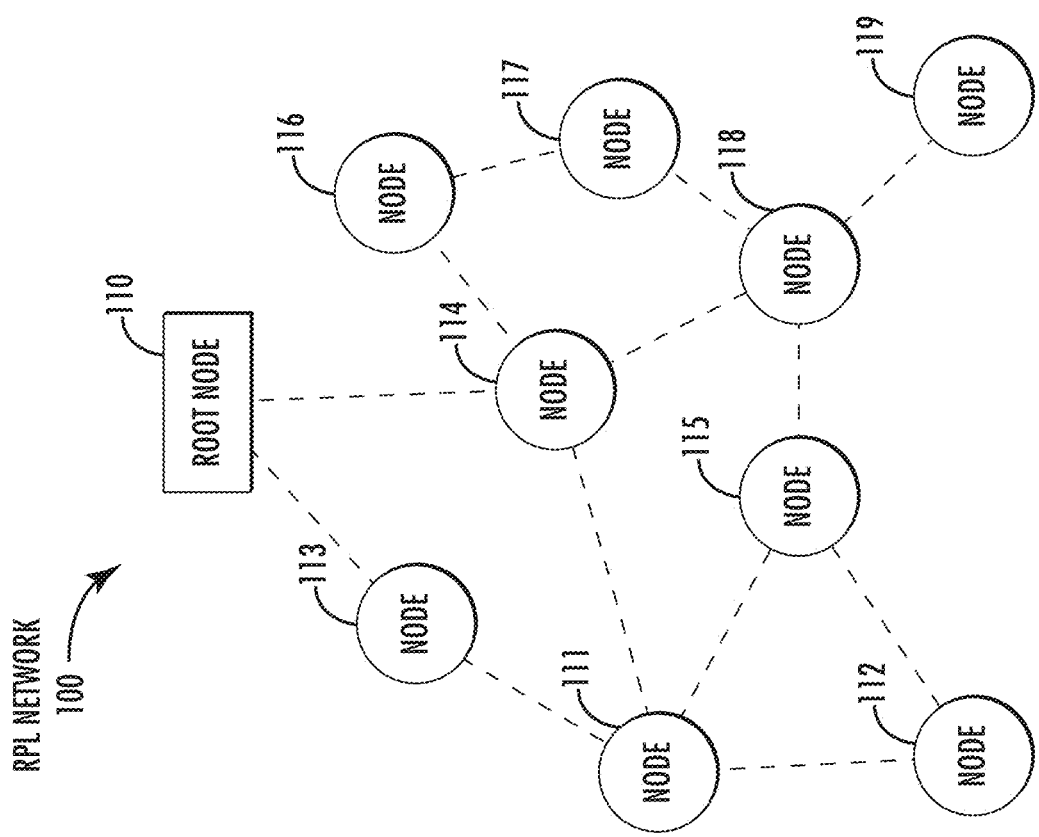

Referring now to the drawings, FIGS. 1a and 1b (collectively referred to herein as FIG. 1) is a diagram of an example RPL network 100 that includes multiple nodes. The nodes in the RPL network 100 may include a root node 110 and one or more additional nodes, such as the nodes 111, 112, 113, 114, 115, 116, 117, 118, and 119. In some cases, each of the nodes 110 through 119 may be configured to transmit and receive messages. In addition, the root node 110 may be configured to communicate with one or more additional computer networks, such as an additional RPL network or a non-RPL network. In addition, each of the nodes 110 through 119 may have a communication path with one or more additional nodes in the RPL network 100. For example, the nodes 110 through 119 may be capable of communicating (e.g., transmitting and/or receiving messages) via wireless communication techniques. For example, the nodes 111 and 112 may be capable of communicating with each other.

Each of the nodes 110 through 119 may perform neighbor discovery operations in order to determine one or more neighboring nodes. The neighbor discovery operations may include transmitting a neighbor-discovery message, such as a neighbor solicitation. In some cases, the neighbor-discovery message may be a multicast message that is directed to any node that is capable of receiving the neighbor-discovery message via a communication path with the node 111. In addition, the neighbor-discovery message may be indicated as not available for retransmission. For example, if the node 112 receives the neighbor-discovery message from the node 111, the node 112 may determine that the neighbor-discovery message is not to be transmitted to any additional nodes. In addition, the neighbor discovery operations may include transmitting a response to the multicast neighbor-discovery message, such as a neighbor advertisement. For example, the node 111 may transmit a neighbor-discovery message via its available communication path. The neighbor-discovery message may be received by the nodes 112, 113, 114, and 115. Responsive to receiving the neighbor-discovery message, the nodes 112, 113, 114, and 115 may each transmit a respective response to the node 111. In some cases, a response may include information about the responding node, such as information describing the responding node's Internet protocol address ("IP address"), media access control address ("MAC address"), ranking, or other suitable information about the responding node. In addition, each of the nodes 110 through 119 may store information about the additional nodes (including non-neighboring nodes). For example, each node in the RPL network 100 may store a respective IP address and MAC address of additional nodes in the RPL network 100. The node information may be stored in any suitable format, such as entries in a lookup table in a memory component of each respective node.

In some implementations, based on the neighbor discovery operations, each of the nodes 110 through 119 may establish one or more neighbor relationships with the additional nodes. FIG. 1a illustrates an example set of neighbor relationships that may be established within the RPL network 100. For illustrative purposes, the example neighbor relationships are illustrated via a dashed line between neighboring nodes. For example, the root node 110 may establish respective neighbor relationships with nodes 113 and 114. In addition, node 111 has neighbor nodes 112, 113, 114, and 115; node 112 has neighbor nodes 111 and 115; node 113 has neighbor nodes root node 110 and node 111; node 114 has neighbor nodes root node 110 and nodes 111, 116, and 118; node 115 has neighbor nodes 111, 112, and 118; node 116 has neighbor nodes 114 and 117; node 117 has neighbor nodes 116 and 118; node 118 has neighbor nodes 114, 115, 117, and 119; and node 119 has neighbor node 118. Each node may store information about its neighbors, such as in the lookup table.

In some implementations, based on the neighbor discovery operations, each of the nodes 110 through 119 may establish neighbor relationships that indicate a parent status or a child status with respect to additional nodes in the RPL network 100. In some cases, the parent-child relationships may be established according to a routing protocol, such as a routing protocol adhering to one or more industry standards. In addition, the parent-child relationships may be established such that the nodes 110 through 119 are related in a directed acyclic graph ("DAG") format. Based on the DAG format, the RPL network 100 has a single root node (such as the root node 110), each non-root node has a single parent node, and each non-root node may or may not have one or more child nodes. Based on the DAG format, the RPL network is directed, wherein network traffic (e.g., messages) is directed between parent nodes and child nodes. Based on the DAG format, the RPL network 100 is acyclic, wherein loops are not formed (e.g., a given node is not both parent and child of another given node).

FIG. 1b illustrates an example set of parent-child relationships that may be established within the RPL network 100. For illustrative purposes, the example parent-child relationships are illustrated via a solid line between parent and child nodes, wherein an arrow points from the child to the parent. The root node 110 may establish one or more child relationships with one or more additional nodes within the RPL network 100. For example, the root node 110 establishes relationships with nodes 113 and 114, wherein the relationships indicate a parent status of the node 110 and a child status of the nodes 113 and 114. In addition, the root node 110 may establish additional relationships with additional nodes external to the RPL network 100 (e.g., relationships with additional nodes in an additional computer networks).

In some cases, each of the non-root nodes 111 through 119 may establish a parent relationship with one additional node. Furthermore, the non-root nodes 111 through 119 may establish one or more child relationships with one or more of the additional nodes. In the RPL network 100, a first node may have a child status with respect to a second node and a parent status with respect to a third node. For example, the node 111 establishes relationships with respect to the nodes 112 and 113. The relationship with node 112 indicates a parent status of node 111 and a child status of node 112. The relationship with node 113 indicates a child status of node 111 and a parent status of node 113. Table 1 summarizes the example parent-child relationships illustrated in FIG. 1b. In some cases, a peer status is indicated for a node that has a neighbor relationship, and is not a parent or a child. For example, nodes 115 and 118 may have a neighbor relationship (such as indicated in FIG. 1a) where neither node 115 or node 118 is the parent or child of the other (such as indicated by Table 1). In addition, the nodes 115 and 118 may establish a neighbor relationship indicating a peer status with respect to each other.

TABLE 1

| Node | Parent of node | Child(ren) of node |
|---|---|---|
| Root Node 110 | (none) | 113, 114 |
| Node 111 | 113 | 112 |
| Node 112 | 111 | 115 |
| Node 113 | Root node 110 | 111 |
| Node 114 | Root node 110 | 116, 118 |
| Node 115 | 112 | (none) |
| Node 116 | 114 | 117 |
| Node 117 | 116 | (none) |
| Node 118 | 114 | 119 |
| Node 119 | 118 | (none) |

In some implementations, based on the neighbor discovery operations, each of the nodes 110 through 119 may determine a respective ranking that indicates the respective node's relative reliability within the RPL network 100. For each respective node, the ranking may indicate the node's ability to transmit messages through the RPL network 100 relative to additional nodes in the RPL network 100. In some cases, each particular node may determine its own ranking based on performance information about the RPL network 100, including performance information describing transmission metrics of one or more of the nodes (e.g., time to transmit a message between nodes), a quantity of routing nodes (e.g., "hops") between the particular node and the root node 110, a quantity of lost messages between the particular node and additional nodes, or any other suitable performance information. The ranking may be calculated as a numeric value. In some cases, the ranking is calculated to be a smaller value based on higher reliability and a larger value based on lower reliability. For example, the root node 110 may have a ranking of 0 based on the ability of the root node 110 to transmit messages to itself with very high reliability. The nodes 113 and 114 may have relatively small ranking numbers of 10 and 15, respectively, based on their ability to transmit messages to the root node 110 with relatively high reliability. The nodes 115 and 119 may have relatively large ranking numbers of 38 and 45, respectively, based on their ability to transmit messages to the root node 110 with relatively poor reliability. Table 2 summarizes example rankings of the nodes 110 through 119 illustrated in FIG. 1. Although the example rankings in Table 2 indicate smaller values based on a higher reliability, other implementations may be used, such as rankings calculated to be smaller values based on lower reliability and larger values based on higher reliability.

TABLE 2

| Node | Ranking |
|---|---|
| Root Node 110 | 0 |
| Node 113 | 10 |
| Node 114 | 15 |
| Node 111 | 20 |
| Node 116 | 23 |
| Node 118 | 27 |
| Node 117 | 30 |
| Node 112 | 34 |
| Node 115 | 38 |
| Node 119 | 45 |

In some implementations, each of the nodes 110 through 119 may perform neighbor detection operations in order to detect a reliability of a neighboring node. The neighbor detection operations may include transmitting a neighbor-detection message, such as a neighbor solicitation. In some cases, the neighbor-detection message may be a unicast message that is directed to a particular neighboring node. In addition, the neighbor detection operations may include transmitting a response to the unicast neighbor-detection message, such as a neighbor advertisement. For example, the node 111 may transmit a detection message to each of the neighboring nodes 112, 113, 114, and 115. Responsive to receiving the detection message, the nodes 112, 113, 114, and 115 may each transmit a respective response to the node 111. In some cases, a response may include information about the responding node, such as information describing the responding node's ranking, or other suitable information about the responding node.

In some cases, a neighbor relationship in the RPL network 100 may be modified. A particular node may determine (such as based on neighbor detection operations) that a neighboring node is non-responsive. For example, a communication path between the particular node in the neighboring node may be interrupted. In addition, the particular node may determine that the neighboring node has a ranking that is less reliable than the ranking of the particular node. For example, the neighboring node may experience a failure or other change in its own operating conditions that has changed the ranking of the neighboring node to indicate a relatively low reliability. Based on determining that the neighboring node is non-responsive or that the ranking of the neighboring node has changed, the particular node may update its neighbor relationship with respect to the nonresponsive node. For example, the particular node may revoke a parent status of the nonresponsive node and attempt to establish a new parent relationship with an additional node in the RPL network 100.

In an example implementation, the node 111 may modify a neighbor relationship with respect to the node 113. For instance, and not by way of limitation, the node 111 may fail to receive, from the node 113, a response to a neighbor-detection message sent by the node 111 (e.g., the node 113 is unresponsive, a connection path is broken). In addition, the node 113 may indicate (e.g., via a neighbor-discovery message) that it is seeking a new parent. The node 111 may modify the neighbor relationship with the node 113 to revoke the parent status of the node 113.

In addition, the node 111 may perform one or more neighbor discovery operations to determine a new parent node. In some cases, the node 111 may transmit a neighbor-discovery message, such as a multicast neighbor-discovery message. The node 111 may receive responses from additional nodes in the RPL network 100, such as responses from the neighboring nodes 112, 114, and 115. In addition, the node 111 may modify one or more of the neighbor relationships with the nodes 112, 114, and 115 based on information included in the responses to the neighbor-discovery message.

In some cases, a node may provide a response to a neighbor-discovery message based on a parent-child relationship with the node that transmitted the neighbor-discovery message. For example, the node 112 may receive the neighbor-discovery message from the node 111. Responsive to receiving the neighbor-discovery message, the node 112 may determine that it has a child status with respect to the node 111. Based on determining the child status, the node 112 may transmit to the node 111 a response that includes an error code. The error code may indicate, for example, that the node 112 is not available as a parent node for the node 111. Based on receiving the response with the error code, the node 111 may establish (or retain) a non-parent neighbor relationship with the node 112. In some cases, determining whether to modify a relationship based on an error code avoids forming a loop in the RPL network 100 by avoiding establishing a parent relationship with a child node.

In addition, a node may provide a response to a neighbor-discovery message based on a ranking of the node. For example, the node 115 may receive the neighbor-discovery message from the node 111. Responsive to receiving the neighbor-discovery message, the node 115 may transmit to the node 111 a response that includes a ranking of the node 115. Based on receiving the response with the ranking, the node 111 may compare the ranking of the node 115 to a ranking of the node 111. Based on a determination that the node 115 has a less reliable ranking compared to the node 111, the node 111 may establish (or retain) a non-parent neighbor relationship with the node 115. In some cases, determining whether to modify a relationship based on a ranking avoids forming a loop in the RPL network 100 by avoiding establishing a parent relationship with a node that has relatively low reliability.

The node 114 may provide an additional response to the neighbor-discovery message. The response from the node 114 may omit an error code, such as an error code indicating that the node 114 is not available as a parent. In addition, the response from the node 114 may include a ranking of the node 114. The node 111 may determine, based on a comparison of the rankings of the node 114 and the node 111, that the node 114 has a more reliable ranking compared to the node 111. Based on the response omitting the error code and on the determination that the node 114 has a more reliable ranking, the node 111 may establish a neighbor relationship with respect to the node 114 indicating a parent status of the node 114 and a child status of the node 111.

Reducing a Quantity of Neighbor-Detection Messages

Figure 2:
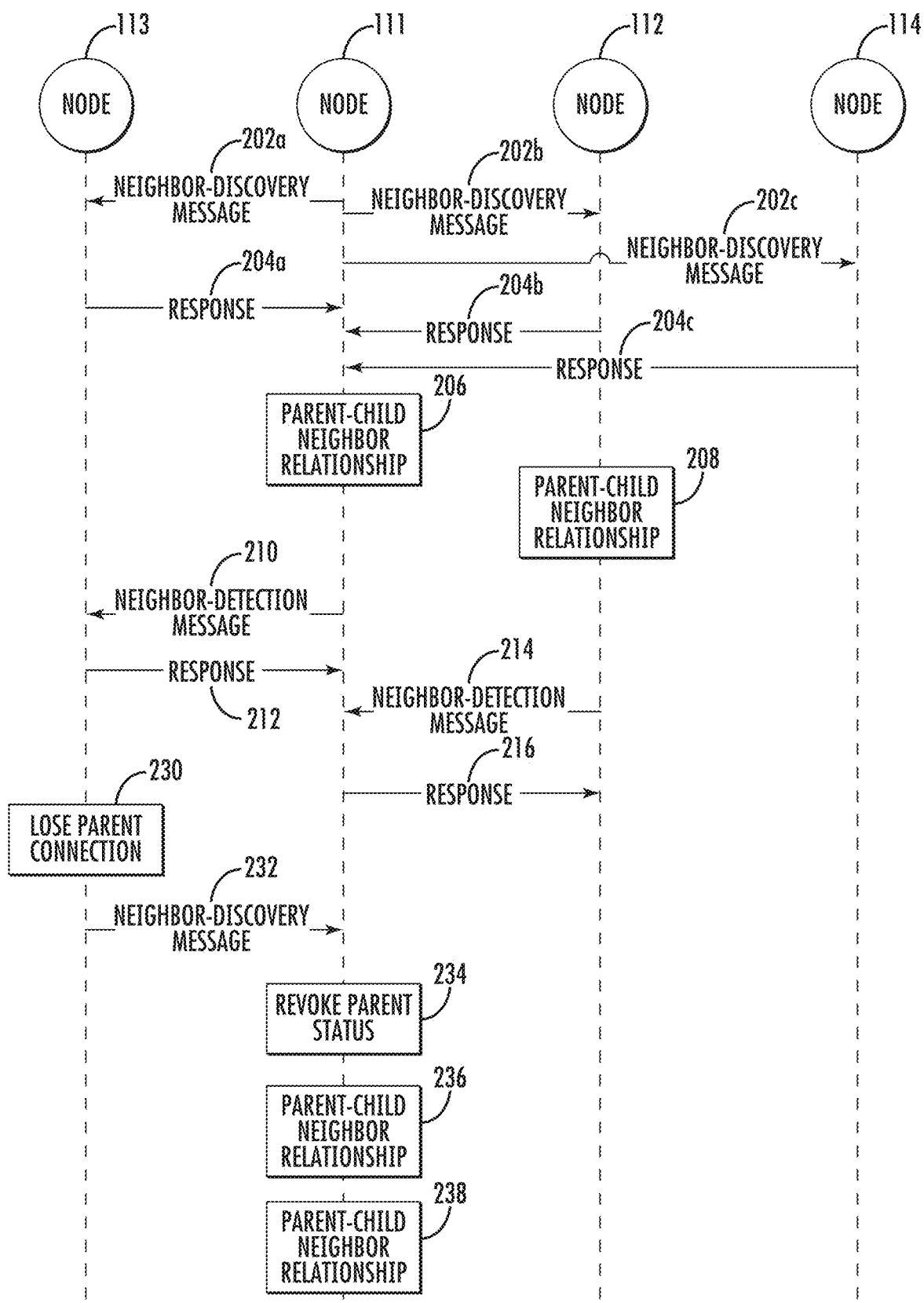
FIG. 2 is a diagram depicting an example data flow to reduce a quantity of messages transmitted on the RPL network, according to certain implementations.

FIG. 2 depicts an example of a data flow for the RPL network 100, according to certain implementations. In some implementations, the data flow depicted in FIG. 2 may reduce a quantity of messages transmitted on the RPL network 100, such as by reducing a number of neighbor-detection messages, and responses to neighbor-detection messages, that are transmitted. In some cases, reducing the quantity of messages may improve the capacity of the RPL network 100, such as by extending a battery life of one or more nodes on the network, or by allocating increased network capacity to carry additional messages that are not neighbor-detection messages.

In FIG. 2, the node 111 may transmit a neighbor-discovery message to one or more nodes. For example, at step 202a, the node 111 may transmit the neighbor-discovery message to node 113. At steps 202b and 202c, the node 111 may transmit the neighbor-discovery message to node 112 and node 114, respectively. In some cases, the neighbor-discovery message may be a multicast message, that is directed to multiple recipient nodes. For example, the node 111 may transmit the multicast neighbor-discovery message once in regards to steps 202a, 202b, and 202c, and the multicast neighbor-discovery message may be received by each of the nodes 113, 112, and 114.

At step 204a, the node 113 transmits a response to the node 111. In addition, the node 112 transmits a response at step 204b, and node 114 transmits a response at step 204c. The responses may each be a unicast message that is directed to the node 111. In regards to steps 204a, 204b, and 204c, the responses may include information about the respective responding node, such as an IP address, a MAC address, a ranking, or other suitable information about the responding node.

The node 111 may receive the responses transmitted by the nodes 113, 112, and 114. Based on the responses, the node 111 may establish one or more neighbor relationships with respect to the nodes 113, 112, and 114. At step 206, for example, the node 111 may establish a neighbor relationship indicating a parent-child status with respect to the node 113. The neighbor relationship established at step 206 may indicate a parent status of the node 113 and a child status of the node 111 (e.g., node 113 is the parent of child node 111). In some cases, additional neighbor relationships may be established in the RPL network 100. For example, at step 208 the node 112 may establish an additional neighbor relationship indicating a parent-child status with respect to the node 111. The additional neighbor relationship established at step 208 may indicate a parent status of the node 111 and a child status of the node 112 (e.g., node 111 is the parent of child node 112). Some nodes in the RPL network 100 may have both a parent status and a child status, such as the node 111 being a parent of node 112 and a child of node 113.

In the RPL network 100, a node may transmit one or more neighbor-detection messages based on the status of the node in a neighbor relationship, such as a parent-child relationship. For example, the node 111 may determine that it has child status with respect to node 113. At step 210, the node 111 may transmit a neighbor-detection message to the node 113, based on the node 113 having parent status with respect to the node 111. In addition, at step 212 the node 113 may transmit a response to the neighbor-detection message that was transmitted at step 210. At step 214, the node 112 may transmit an additional neighbor-detection message to the node 111, based on the node 111 having parent status with respect to the node 112. In addition, at step 216 the node 111 may transmit an additional response to the additional neighbor-detection message that was transmitted at step 214.

In some implementations, a node in the RPL network 100 may withhold a neighbor-detection message based on the status of the node in a neighbor relationship, such as a parent-child relationship. For example, in regards to step 210, the node 111 may withhold transmission of a neighbor-detection message to the node 112, based on the node 112 having child status with respect to the node 111. Withholding a message may include not generating a message, or not transmitting a message that is generated. For example, the node 111 may be configured to, based on the child status of node 112, perform (or avoid performing) operations related to generating or transmitting a neighbor-detection message for node 112. Node 111 may avoid generating a neighbor-detection message to node 112, or may transmit a generated neighbor-detection message to a first node (e.g., node 113) and avoid transmitting the generated neighbor-detection message to a second node (e.g., node 112).

In regards to step 212, the node 112 may be configured to not generate a response, as it did not receive the withheld neighbor-detection message. In addition, the node 113 may withhold transmission of an additional neighbor-detection message to the node 111, based on the node 111 having child status with respect to the node 113, and the node 111 may withhold a response. In some cases, withholding neighbor-detection messages based on a status of a node in a neighbor relationship may reduce a quantity of neighbor-detection messages and a quantity of responses to neighbor-detection messages that are transmitted on the RPL network 100.

In some implementations, a node in the RPL network 100 may modify a neighbor relationship with a neighboring node, such as to change a child node to a parent node, or a parent node to a child node. The neighbor relationship may be modified based on information indicated by a message from the neighboring node, such as a neighbor-discovery message. In addition, the neighbor relationship may be modified based on a status of the neighboring node, such as a parent or child status in the neighbor relationship (e.g., the unmodified neighbor relationship). The example data flow depicted in FIG. 2 illustrates an example modification of a neighbor relationship in an environment in which neighbor-detection messages are reduced based on a parent-child status in a neighbor relationship. However, other implementations are possible, such as modifying a neighbor relationship in an environment in which neighbor-detection messages are not reduced.

At step 230 in FIG. 2, the node 113 may lose a connection to its own parent node, such as a node having a parent status with respect to the node 113. For instance, the node 113 may lose a connection to root node 110, indicated in Table 1 as the example parent of node 113. In some cases, the node 113 may attempt to find a new parent node. For example, at step 232, the node 113 may transmit a neighbor-discovery message to one or more nodes in the RPL network 100, such as to the node 111. In some cases in regards to step 232, the neighbor-discovery message may be a multicast message, such as a multicast message that is directed to multiple recipient nodes. In addition, the neighbor-discovery message in regards to step 232 may include an error code, such as an error indicating that the node 113 does not have a parent.

The node 111 may receive the neighbor-discovery message transmitted at step 232. In addition, the node 111 may determine that the transmitting node 113 has a parent status with respect to the node 111. Responsive to determining that the node 113 has the parent status, the node 111 may modify the neighbor relationship with the node 113, such as at one or more of steps 234 or 238. In addition, the node 111 may establish (or modify) one or more additional neighbor relationships with additional nodes in the RPL network 100, such as at step 236.

At step 234, for example, the node 111 may revoke the parent status of the node 113. Revoking the parent status may include modifying the neighbor relationship with respect to node 113 to indicate that the node 113 has no status, or has an additional status that is not parent (e.g., child, peer).

At step 236, the node 111 may establish or modify an additional neighbor relationship with the node 114. The additional neighbor relationship may indicate a parent status of the node 114 and a child status of the node 111 (e.g., node 114 is the new parent of child node 111). In some cases, the additional neighbor relationship is established or modified based on one or more additional messages, such as a multicast neighbor-discovery message that is transmitted by node 111 for the purpose of finding a new parent. In addition, the additional neighbor relationship is established or modified based on previously received information, such as the response from node 114 received in regards to step 204c.

At step 238, the node 111 may modify the neighbor relationship with the node 113 to indicate an additional parent status of the node 111 and a child status of the node 113 (e.g., node 111 is the new parent of child node 113). Although FIG. 2 depicts performing this modification at step 238, other implementations are possible, such as modifying the neighbor relationship at step 234 to indicate the child status of the node 113.

Figure 3:
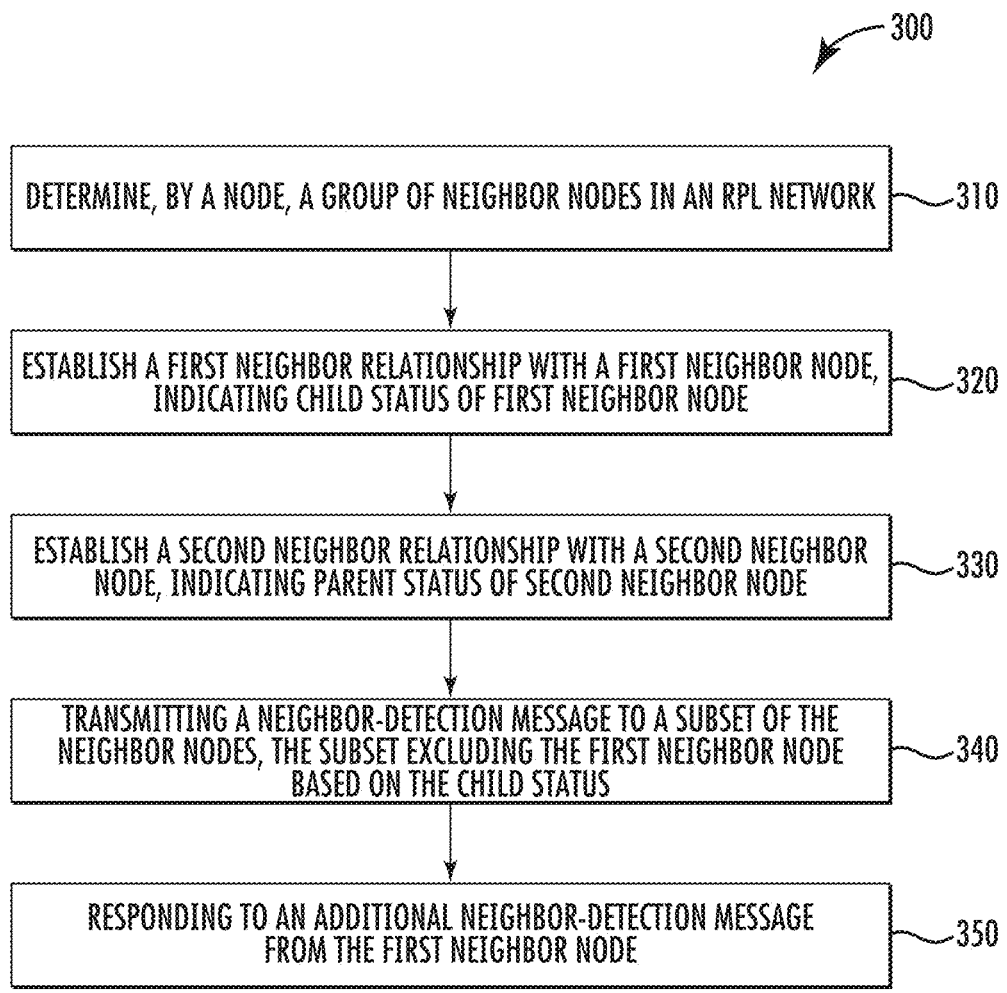
FIG. 3 is a flow chart depicting an example of a process for transmitting a reduced quantity of neighbor-detection messages in an RPL network, according to certain implementations.

FIG. 3 is a flow chart depicting an example of a process 300 for transmitting a reduced quantity of neighbor-detection messages in an RPL network. In some implementations, such as described in regards to FIGS. 1-2, a computing device configured as a node in an RPL network implements operations described in FIG. 3, by executing suitable program code. For illustrative purposes, the process 300 is described with reference to the examples depicted in FIGS. 1-2. Other implementations, however, are possible.

At block 310, the process 300 involves determining, by a node in an RPL network, a group of neighbor nodes in the RPL network. The node may determine the neighbor nodes based on a transmitted neighbor-discovery message, such as a neighbor-discovery message transmitted by the node 111 in regards to steps 202a, 202b, or 202c. The neighbor-discovery message may be transmitted as a multicast message. In addition, the neighbor-discovery message may be indicated as not available for retransmission. In some cases, the multicast neighbor-discovery message may be transmitted to additional nodes having direct communication links with the transmitting node and not retransmitted to any further nodes not having direct communication links with the transmitting node.

In some implementations, the node may receive responses from one or more additional nodes that receive the neighbor-discovery message, such as neighbor nodes having direct communication links with the node. In addition, the node may establish neighbor relationships based on, at least, information included in the responses. In addition, the node may manage the neighbor relationships with each of the neighboring nodes, such as via one or more neighbor-detection messages. The neighbor-detection messages may be transmitted as unicast messages, including a generated neighbor-detection message that is transmitted multiple times (e.g., to each neighbor node), or multiple generated neighbor-detection messages that are respectively transmitted to a respective one of the neighboring nodes. The neighboring nodes may be configured to respond to the neighbor-detection message. In some cases, the node may manage the neighbor relationships based on such responses.

At block 320, the process 300 involves establishing, by the node, a first neighbor relationship with respect to a first neighbor node in the group of neighbor nodes. The first neighbor relationship may indicate one or more of a parent status of the node or a child status of the first neighbor node. At block 330, the process 300 involves establishing, by the node, a second neighbor relationship with respect to a second neighbor node in the group of neighbor nodes. The second neighbor relationship may indicate one or more of a child status of the node or a parent status of the second neighbor node. For example, the node 111 may establish neighbor relationships with each of nodes 112 and 113. The first neighbor relationship with respect to node 112 may indicate a parent status of node 111 and a child status of node 112. The second neighbor relationship with respect to node 113 may indicate a parent status of node 113 and a child status of node 111. In some implementations, operations described with regards to blocks 320 and 330 may be performed in various orders. For example, the node may establish a neighbor relationship with a parent node prior to establishing another neighbor relationship with one or more child nodes (e.g., the node may establish a parent, as generally described in regards to block 330, before establishing any children, as generally described in regards to block 320).

At block 340, the process 300 involves transmitting, by the node, a neighbor-detection message to a subset of the group of neighbor nodes. The subset may exclude the first neighbor node based on the first neighbor node having the child status with respect to the node. In addition, the subset may include the second neighbor node based on the second neighbor node having the parent status with respect to the node. In some cases, additional neighbor nodes in the group may be included in the subset based on their having a non-child status (e.g., peer status) with respect to the node.

At block 350, the process 300 involves responding, by the node, to an additional neighbor-detection message received from the first neighbor node. For example, responsive to receiving from the node 112 a neighbor-detection message, node 111 may transmit a response to the node 112. In some cases, operations related to block 350 may be optional, such as if the first neighbor node does not send an additional neighbor-detection message to the node.

Figure 4:
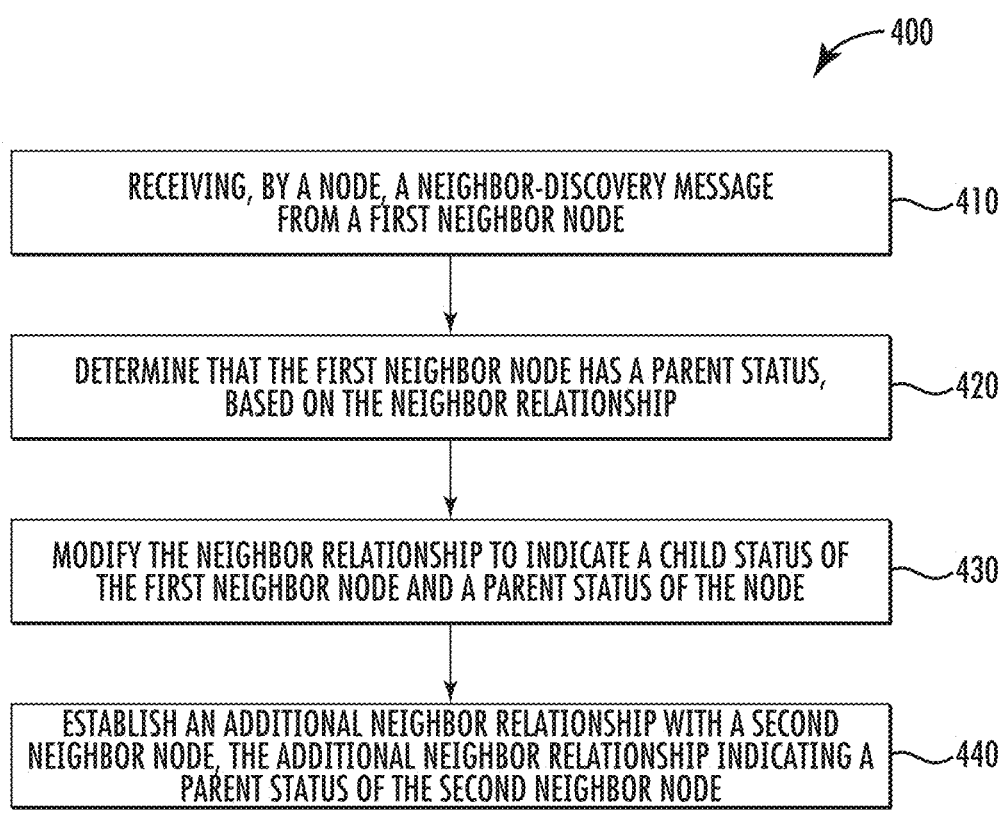
FIG. 4 is a flow chart depicting an example of a process for modifying a neighbor relationship between nodes in an RPL network, according to certain implementations.

In some implementations, a node in an RPL network may modify a neighbor relationship with a neighboring node, such as to change a child node to a parent node, or a parent node to a child node. FIG. 4 is a flow chart depicting an example of a process 400 for modifying a neighbor relationship between nodes in an RPL network. In some implementations, such as described in regards to FIGS. 1-3, a computing device configured as a node in the RPL network implements operations described in FIG. 4, by executing suitable program code. For illustrative purposes, the process 400 is described with reference to the examples depicted in FIGS. 1-3. Other implementations, however, are possible.

At block 410, the process 400 involves receiving a neighbor-discovery message in an RPL network. The neighbor-discovery message may be received by a node in the RPL network, and transmitted by a first neighbor node in the RPL network. In addition, the node and the first neighbor node may have a neighbor relationship with respect to each other, such as a neighbor relationship indicating a parent-child status of the node or of the first neighbor node. For example, node 111 may receive a neighbor-discovery message from the node 113 in the RPL network 100. The node 111 may also have a neighbor relationship with the node 113, indicating a parent status of the node 113 and a child status of the node 111.

In some cases in regards to block 410, the neighbor-discovery message may include or otherwise indicate an error code. For example, the node 111 may receive, included with the neighbor-discovery message, an error code indicating that the node 113 does not have a parent node, or that the node 113 is seeking a new parent node, or additional information related to the error code.

At block 420, the process 400 involves determining, by the node, a parent status of the first neighbor node with respect to the node. The parent status may be determined based on the neighbor relationship with respect to the first neighbor node. For example, responsive to receiving the neighbor-discovery message from the node 113, node 111 may determine whether node 113 has a parent status with respect to the node 111, based on the neighbor relationship with respect to the node 113.

At block 430, the process 400 involves modifying, by the node, the neighbor relationship with respect to the first neighbor node. The modified neighbor relationship may revoke the parent status of the first neighbor node with respect to the node. In addition, the modified neighbor relationship may indicate one or more of a parent status of the node or a child status of the first neighbor node. For example, the node 111 may modify the neighbor relationship with node 113 to revoke the parent status of node 113, to indicate an additional parent status of the node 111, to indicate a child status of the node 113, or any combination of such modifications.

At block 440, the process 400 involves establishing, by the node, an additional neighbor relationship with a second neighbor node of the RPL network. The additional neighbor relationship may indicate one or more of a parent status of the first neighbor node or a child status of the node. The node 111, for example, may establish an additional neighbor relationship with respect to node 114, indicating a parent status of the node 114 and a child status of the node 111.

Preventing Formation of Loops

Figure 5:
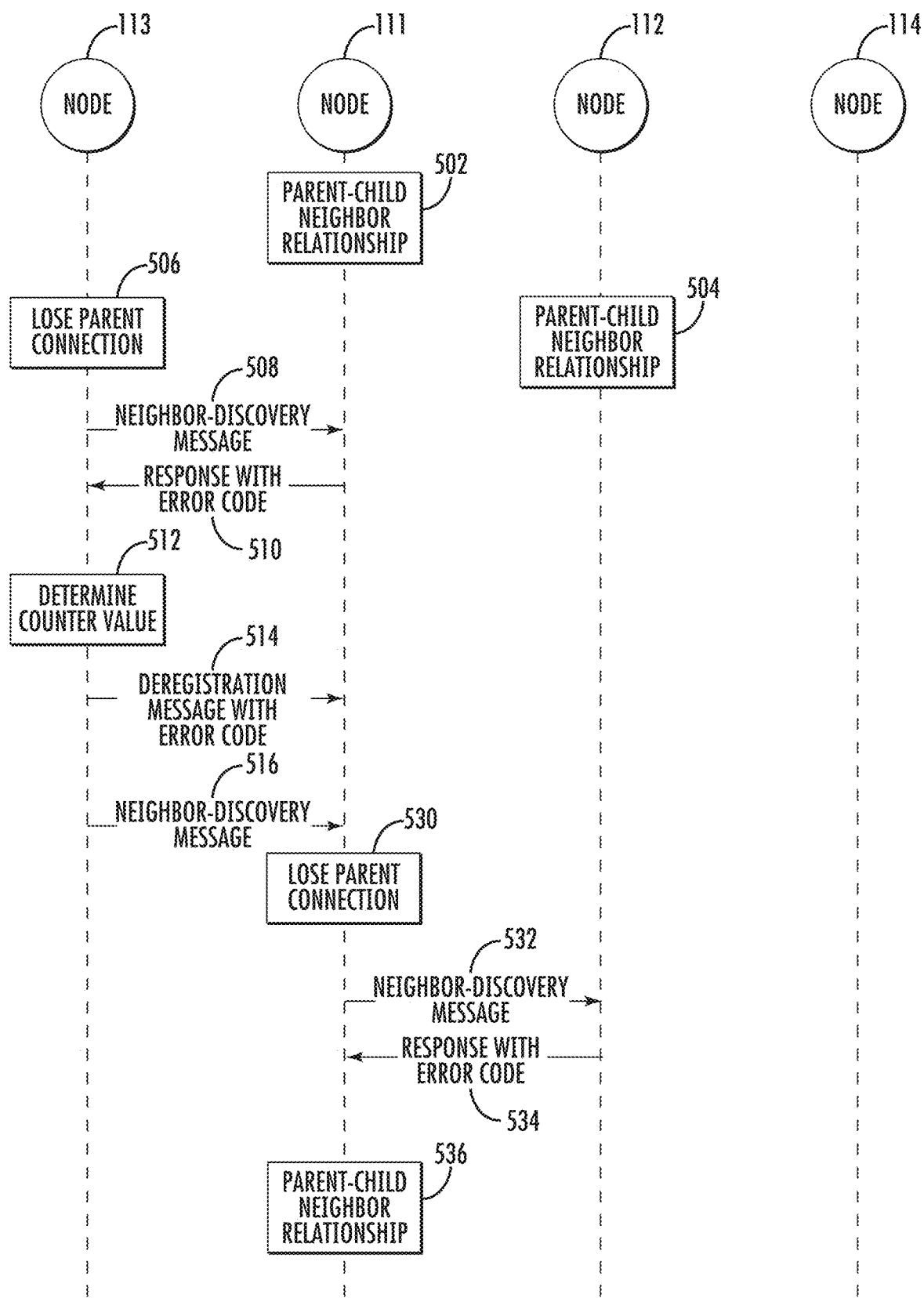
FIG. 5 is a diagram depicting an example data flow to avoid formation of loops in an RPL network based on a determination of a parent-child status, according to certain implementations.

FIG. 5 depicts an example of a data flow for the RPL network 100, according to certain implementations. In some implementations, the data flow depicted in FIG. 5 may avoid the formation of loops in routes between nodes of the RPL network 100. For example, a node that is seeking a parent may request to become the child node of its own child, such as by sending a neighbor-discovery message. In some cases, steps described in regards to FIG. 5 may prevent the node from establishing a child relationship with its own child. In addition, steps described in regards to FIG. 5 may cause the node to establish a parent relationship with an additional node (e.g., not a child of the node).

In FIG. 5, the node 111 may establish a neighbor relationship with respect to one or more additional nodes in the RPL network 100. For example, at step 502, the node 111 may establish a neighbor relationship indicating a parent-child status with respect to the node 113. The neighbor relationship established at step 502 may indicate a parent status of the node 113 and a child status of the node 111 (e.g., node 113 as the parent of child node 111). The node 111 may have both parent status and a child status in the RPL network 100. For example, at step 504 the node 112 may establish an additional neighbor relationship indicating a parent-child status with respect to the node 111. The additional neighbor relationship established at step 504 may indicate a parent status of the node 111 and a child status of the node 112 (e.g., node 111 is the parent of child node 112).

At step 506 in FIG. 5, the node 113 may lose a connection to its own parent node. For instance, the node 113 may lose a connection to the root node 110, indicated in Table 1 as the example parent of node 113. In some cases, the node 113 may attempt to find a new parent node. For example, at step 508 the node 113 may transmit a neighbor-discovery message to one or more nodes in the RPL network 100, such as to the node 111. In some cases in regards to step 508, the neighbor-discovery message may be a multicast message that is directed to multiple recipient nodes. The multicast message may be received by recipient nodes that have a communication path with the node 113 (e.g., capable of receiving the multicast message directly, without retransmission). In addition, the neighbor-discovery message in regards to step 508 may include an error code, such as an error indicating that the node 113 does not have a parent.

The node 111 may receive the neighbor-discovery message transmitted at step 508. The node 111 may determine that the transmitting node 113 has a parent status with respect to the node 111. Responsive to determining that the node 113 has the parent status, node 111 may transmit a response to the neighbor-discovery message, such as at step 510. The response may be a unicast message that is directed at the node 113. The response in regards to step 510 may include an error code, such as an error code indicating that the node 111 is not available as a parent node for the node 113. In some cases, the error code in regards to step 510 may indicate a status of a memory cache, such as a "Neighbor Cache Full" error code that is compliant with the standard RFC 6775 for "Neighbor Discovery Optimization for IPv6 over Low-Power Wireless Personal Area Networks (6LoW-PANs)." In addition, the error code in regards to step 510 may indicate that no route upwards (e.g., a route towards the root node 110) is available to the requesting node, such as a "No Route" error code that is described in addition to error codes described in the standard RFC 6775. Based on receiving the response with the error code at step 510, the node 113 may establish (or retain) a neighbor relationship indicating a child status of the node 111. In addition, the node 113 may establish (or attempt to establish) a parent neighbor relationship with an additional node in the RPL network 100. In some cases, establishing or maintaining a child neighbor relationship with a child node based on an error code received from the child node may prevent a loop from forming in the RPL network 100, such as a loop between the node 111 and the node 113.

In some implementations of an RPL network, a node that is seeking a parent node may determine a value of a counter associated with an additional node that has provided a response with an error code. For example, at step 512 the node 113 may determine a value of a counter associated with the node 111. In some cases, the counter may be initialized by the node 113 responsive to receiving the response with the error code in regards to step 510. The initialized counter may have a value based on the response received at step 510. In addition, the node 113 may have a counter already running for the node 111, and the node 113 may check the value of the running counter. In some cases, the counter may be a lifetime registration counter, such as a registration counter that is based on a lifetime value indicated in the response received at step 510. For example, the lifetime value may comply with the standard RFC 4861 for "Neighbor Discovery for IP version 6 (IPv6)."

The counter initialized at step 510 may count (e.g., increment or decrement) for a period of time, such as a period of time indicated by the lifetime value. In some cases, the node 113 withholds additional neighbor-discovery messages from the node 111 during the period of time associated with the counter. For example, if the response transmitted by the node 111 at step 510 indicates that the node 111 has a particular lifetime value indicating a particular period of time (e.g., one day), the node 113 withholds additional neighbor-discovery messages from the node 111 during the particular period of time. If the node 113 is still seeking a parent upon completion of the counter, the node 113 may transmit additional neighbor-discovery messages to the node 111 after the particular period of time (e.g., after one day).

In some implementations, the node that is seeking a parent node may be unable to find a new parent node that is not a child of the node seeking a parent. The node may transmit a deregistration message. The deregistration message may be transmitted to an additional node that has previously provided a response with an error code, such as a child of the node seeking a parent. In addition, the deregistration message may indicate a modification of a neighbor relationship, such as a revocation of a child status of the additional node. For example, at step 514 the node 113 may transmit a deregistration message to the node 111. The deregistration message may include an error code indicating a modification of the neighbor relationship between the node 113 in the node 111. In some cases, node 111 may modify the neighbor relationship with respect to node 113 to revoke the child status of node 111 and/or the parent status of node 113. In addition, node 111 may modify the neighbor relationship with respect to node 113 to indicate an additional status (e.g., peer, child) of the node 113.

At step 516, the node 113 may transmit an additional neighbor-discovery message to the node 111. The additional neighbor-discovery message may indicate that the node 113 is seeking a parent node. Based on the additional neighbor-discovery message, the node 111 may transmit to the node 113 a response that indicates the node 111 is available as a parent (e.g., a response omitting an error code). In addition, the node 113 may establish (or modify) the neighbor relationship with the node 111 indicating a parent status of the node 111 and a child status of the node 113. In some cases, the deregistration message in regards to step 514 and the additional neighbor-discovery message in regards to step 516 may be transmitted during the period of time indicated by the counter initialized at step 512. For example, if the node 113 is unable to find a new parent during the period of time associated with the counter, the node 113 may transmit the deregistration message or the additional neighbor-discovery message while the counter is running. In some cases, transmitting the deregistration message and the additional neighbor-discovery message may allow the node 113 to establish a new route to the root node 110, via node 111, while a counter based on the lifetime value of node 111 is running.

In some implementations of an RPL network, a node that receives an error code may establish a neighbor relationship with an additional node (e.g., an additional node that did not provide the error code). At step 530, for example, the node 111 may lose a connection to its parent node. Responsive to determining that the connection to the parent node is lost, the node 111 may attempt to find a new parent node. For example, at step 532, the node 111 may transmit a neighbor-discovery message to one or more nodes in the RPL network 100, such as to the node 112. In some cases in regards to step 532, the neighbor-discovery message may be a multicast message that is directed to multiple recipient nodes. In addition, the neighbor-discovery message at step 532 may include an error code, such as an error code indicating that the node 111 does not have a parent.

At step 534, the node 111 may receive from the node 112 a response that includes an error code indicating that the node 112 is not available as a parent node for the node 111. In some cases, the error code at step 534 is the same, or similar to, the error code described at step 510, such as a particular error code indicating unavailability as a parent. Based on receiving the response with the error code at step 534, the node 111 may establish (or retain) a neighbor relationship with the node 112, such as a neighbor relationship indicating a child status of the node 112 and a parent status of the node 111. In some cases, the node 111 may initialize a counter based on the response received at step 534, such as a lifetime registration counter indicating a period of time during which additional neighbor-discovery messages are withheld from the node 112.

Responsive to receiving the response with the error code at step 534, the node 111 may establish (or attempt to establish) a parent neighbor relationship with an additional node in the RPL network 100. For example, at step 536, the node 111 may establish an additional neighbor relationship with respect to the node 114. The additional neighbor relationship with the node 114 may indicate a parent status of the node 114 and a child status of the node 111. In some cases, the additional neighbor relationship is established or modified based on one or more additional messages, such as a multicast neighbor-discovery message that is transmitted by node 111 for the purpose of finding a new parent. In addition, the additional neighbor relationship is established or modified based on previously received information, such as a response from node 114 to a previously transmitted neighbor-discovery message. In some cases, establishing a parent neighbor relationship with an additional node based on an error code received from a child node may prevent a loop from forming in the RPL network 100, such as a loop between the node 111 and node 112.

Figure 6:
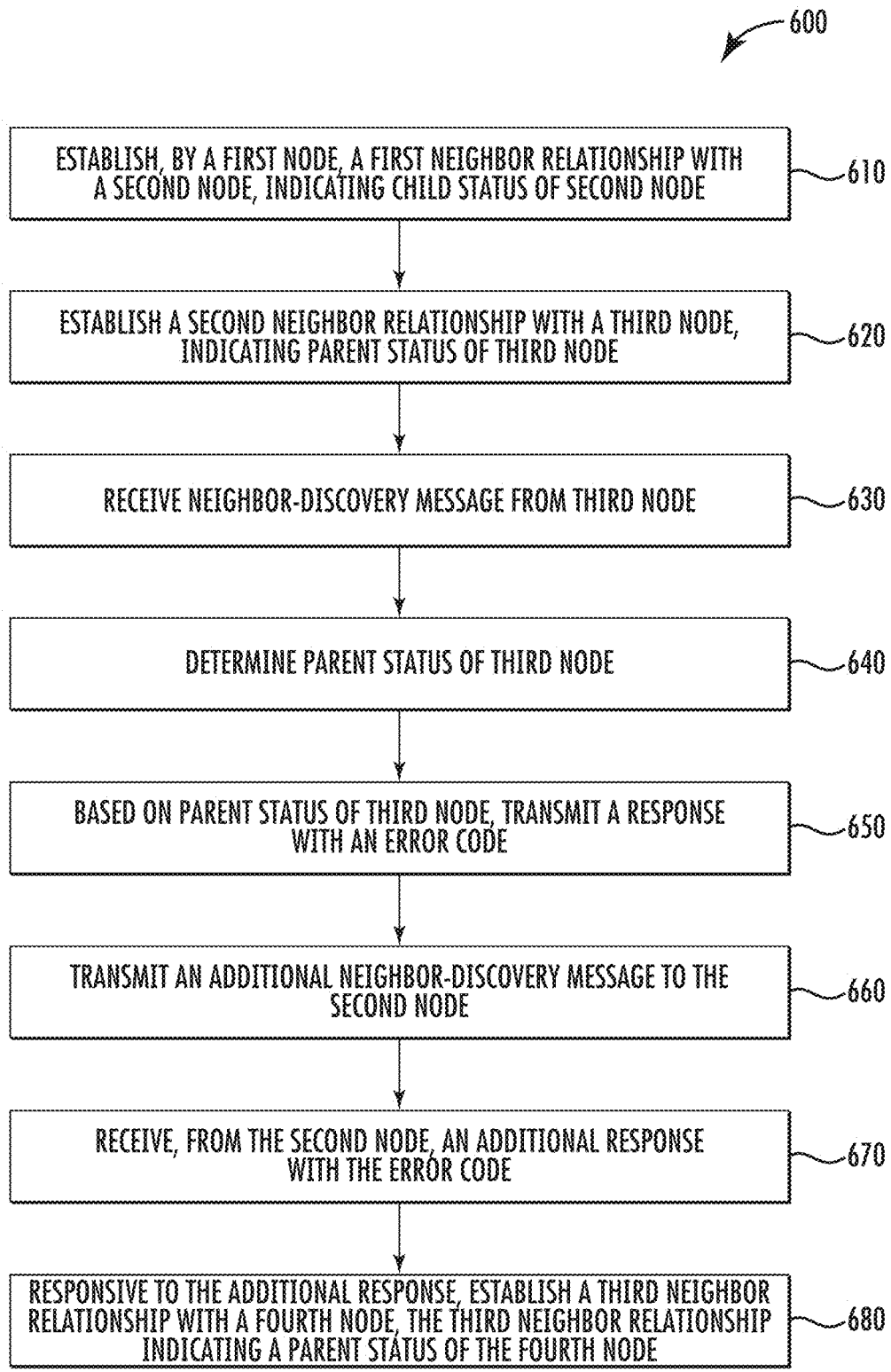
FIG. 6 is a flow chart depicting an example of a process for avoiding formation of loops in an RPL network based on a determination of a parent-child status, according to certain implementations.

FIG. 6 is a flow chart depicting an example of a process 600 for avoiding formation of loops in an RPL network based on a determination of a parent-child status. In some implementations, such as described in regards to FIGS. 1-5, a computing device configured as a node in an RPL network implements operations described in FIG. 6, by executing suitable program code. For illustrative purposes, the process 600 is described with reference to the examples depicted in FIGS. 1-5. Other implementations, however, are possible.

At block 610, the process 600 involves establishing, by a first node in an RPL network, a first neighbor relationship with respect to a second node in the RPL network. The first neighbor relationship may indicate a parent status of the first node or a child status of the second node. At block 620, the process 600 involves establishing, by the first node, a second neighbor relationship with respect to a third node in the RPL network. The second neighbor relationship may indicate a child status of the first node or a parent status of the third node. For example, the node 111 may establish (or retain) neighbor relationships with each of the nodes 112 and 113. The first neighbor relationship with respect to node 112 may indicate a parent status of node 111 and a child status of node 112. The second neighbor relationship with respect to node 113 may indicate a parent status of node 113 and a child status of node 111. In some implementations, operations described with regards to blocks 610 and 620 may be performed in various orders. For example, the node may establish a neighbor relationship with a parent node prior to establishing another neighbor relationship with one or more child nodes (e.g., the node may establish a parent, as generally described in regards to block 620, before establishing any children, as generally described in regards to block 610).

At block 630, the process 600 involves receiving, by the first node, a neighbor-discovery message transmitted from the third node, such as a neighbor-discovery message indicating that the third node is seeking a parent. The neighbor-discovery message may be received as a multicast message. In addition, the neighbor-discovery message may indicate a requested modification of the second neighbor relationship. In some cases, fulfilling the requested modification would revise the status of the first or third nodes (e.g., the first node's status would be revised to parent, the third node's status would be revised to child). For example, the node 111 may receive from the node 113 a neighbor-discovery message indicating that the node 113 is seeking a parent node, such as at step 508.

At block 640, the process 600 involves determining, by the first node, the parent status of the third node. In some cases, the first node determines the parent status based on the second neighbor relationship with respect to the third node. For example, responsive to receiving a neighbor-discovery message from node 113, node 111 may determine that the node 113 has a parent status with respect to node 111.

At block 650, the process 600 involves transmitting, by the first node and to the third node, a response to the neighbor-discovery message. The response may include an error code, such as an error code indicating that the requested modification of the second neighbor relationship is not available. For example, the error code may indicate that the first node is not available as a parent for the third node. For example, the node 111 may transmit to the node 113 a response with an error code, such as at step 510. In some cases, the response transmitted by the first node may indicate a lifetime value for the first node, such as a lifetime value by which the third node may initialize a counter.

At block 660, the process 600 involves transmitting, by the first node, an additional neighbor-discovery message to the second node. The additional neighbor-discovery message may be transmitted as a multicast message. The additional neighbor-discovery message may indicate a requested modification of the first neighbor relationship, such that fulfilling the requested modification would revise the status of the first or second nodes (e.g., the first node's status would be revised to child, the second node's status would be revised to parent). In some cases, the first node may transmit the additional neighbor-discovery message based on having lost a connection to a node with which the first node has a parent relationship, such as the third node. For example, the node 111 may transmit a neighbor-discovery message to node 112, such as at step 532, based on having lost its parent connection at step 530. In addition, the neighbor-discovery message in regards to step 532 may indicate a requested modification to the neighbor relationship between nodes 111 and 112.

At block 670, the process 600 involves receiving, by the first node and from the second node, an additional response to the additional neighbor-discovery message. The additional response may include an error code, such as an error code indicating that the requested modification of the first neighbor relationship is not available. For example, the error code may indicate that the second node is not available as a parent for the first node. For example, the node 111 may receive from the node 112 a response with an error code, such as at step 534. In some cases, the additional response transmitted by the second node may indicate a lifetime value for the second node. In addition, the first node may initialize a counter associated with the second node. During a period of time indicated by the counter (e.g., while the counter is incrementing or decrementing), the first node may withhold further neighbor-discovery messages from the second node.

At block 680, the process 600 involves establishing, by the first node, a third neighbor relationship with respect to a fourth node in the RPL network. The third neighbor relationship may be established responsive to receiving the additional response with the error code. In addition, the third neighbor relationship may indicate a parent status of the fourth node or a child status of the first node. For example, the node 111 may establish (or modify) a neighbor relationship with the node 114, such as at step 536.

Although the blocks 660, 670, and 680 are described in regards to blocks 610 through 650, other implementations are possible. For example, a node that transmits a neighbor-discovery message for the purpose of finding a new parent, such as generally described in regards to blocks 660 through 680, may, but need not, receive or respond to another neighbor-discovery message, such as generally described in regards to blocks 610 through 650.

Figure 7:
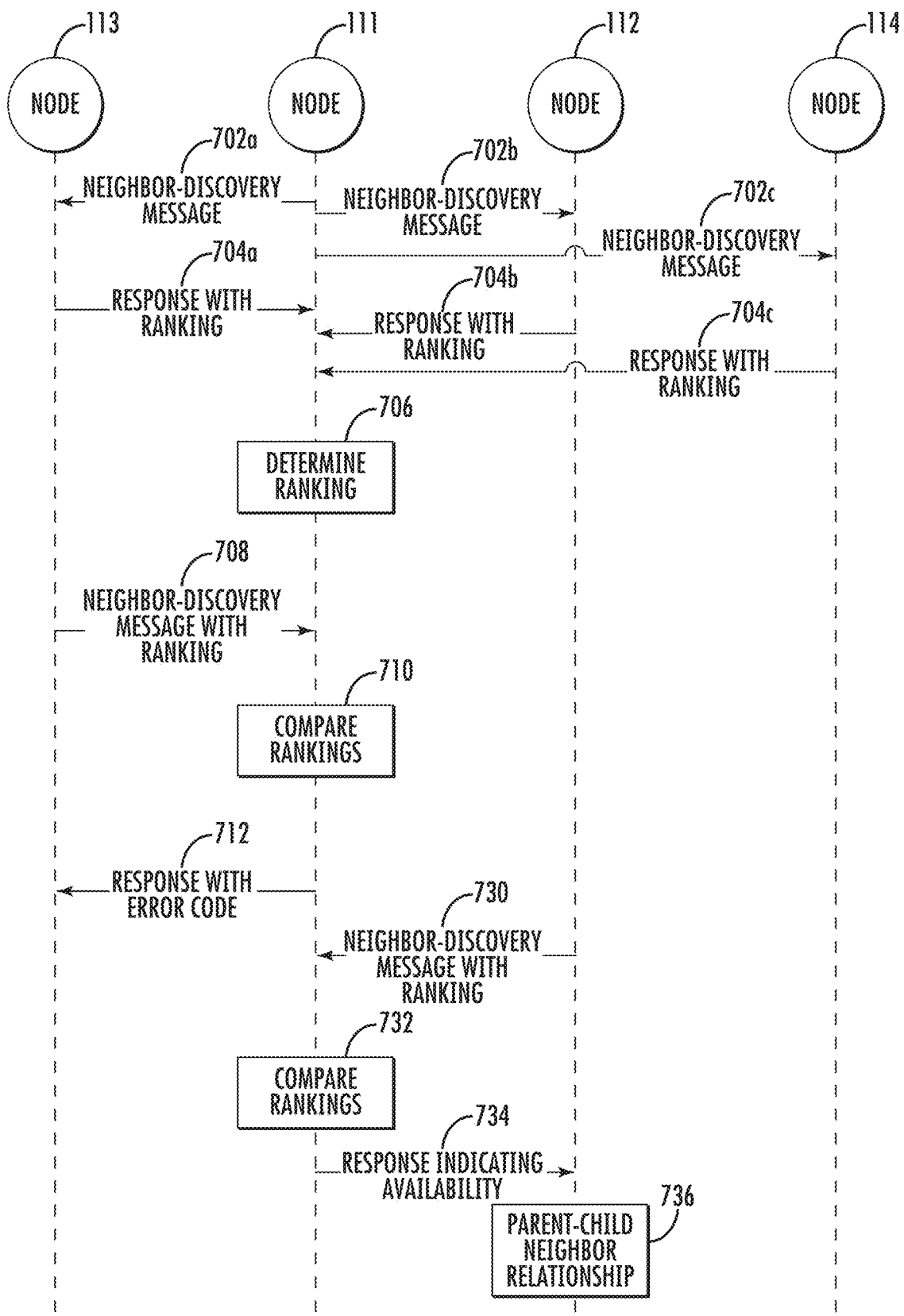
FIG. 7 is a diagram depicting an example data flow to avoid formation of loops in an RPL network based on a comparison of node rankings, according to certain implementations.

FIG. 7 depicts an example of a data flow for the RPL network 100, according to certain implementations. In some implementations, the data flow depicted in FIG. 7 may avoid the formation of loops in routes between nodes of the RPL network 100, such as by causing a node to establish a parent relationship with an additional node having a more reliable ranking. For example, a node that is seeking a parent may request to become the child node of a node with a low reliability, such as a grandchild node. In some cases, steps described in regards to FIG. 7 may prevent from the node from establishing a child relationship with a grandchild node or other low-reliability node. In addition, steps described in regards to FIG. 7 may cause the node to establish a parent relationship with an additional node having a high reliability (e.g., not a grandchild node)

In FIG. 7, the node 111 may transmit a neighbor-discovery message to one or more nodes in the RPL network 100. For example, at step 702a, the node 111 may transmit the neighbor-discovery message to node 113. At steps 702b and 702c, the node 111 may transmit the neighbor-discovery message to node 112 and node 114, respectively. In some cases, the neighbor-discovery message may be a multicast message that is directed to multiple recipients. For example, the node 111 may transmit the multicast neighbor-discovery message once in regards to steps 702a, 702b, and 702c, and the multicast neighbor-discovery message may be received by each of the nodes 113, 112, and 114.

At step 704a, the node 113 transmits a response to the node 111. In addition, the node 112 transmits a response at step 704b, and node 114 transmits a response at step 704c. The responses may each be a unicast message that is directed to the node 111. In regards to the steps 704a, 704b, and 704c, the responses may include information about the respective responding node, such as a ranking, an IP address, a MAC address, or other suitable information about the responding node. In some cases, the node 111 receives transmission metrics associated with one or more of the responding nodes 113, 112, or 114. The transmission metrics may describe a reliability with which the responding node transmits or routes messages to the root node 110. For example, the transmission metrics may describe a time to transmit a message between the responding node and an additional node, a quantity of routing nodes (e.g., "hops") between the responding node and the root node 110, a quantity of lost messages between the responding node and additional nodes, or any other suitable information describing a reliability of the responding node's performance. In some cases, the node 111 receives the transmission metrics based on information included in the responses in regards to steps 704a-704c.

The node 111 may receive the responses in regards to steps 704a-704c, including the respective rankings and transmission metrics for the nodes 113, 112, and 114. At step 706, the node 111 may determine a ranking for itself based on the transmission metrics. For example, the node 111 may determine for itself the example ranking of 20 indicated in Table 2. The ranking determined at step 706 may indicate the ability of the node 111 to transmit messages through the RPL network 100 relative to additional nodes in the RPL network 100, including one or more of the nodes 112, 113, or 114.

At step 708, the node 111 may receive from the node 113 a neighbor-discovery message. For example, the neighbor-discovery message received at step 708 may be a multicast neighbor-discovery message indicating that the node 113 is seeking a parent node. In addition, the neighbor-discovery message received at step 708 may include a ranking of the node 113, such as the example ranking of 10 indicated for the node 113 in Table 2.

At step 710, the node 111 may compare its own ranking to the ranking received in regards to step 708. For example, the node 111 may compare the numeric value of 20 to the numeric value of 10. In addition, the node 111 may determine that the node 113 has a higher reliability as compared to node 111, based on the respective rankings of the nodes 113 and 111 (e.g., a ranking of 10 indicates a higher reliability as compared to a ranking of 20).

At step 712, the node 111 may transmit to the node 113 a response with an error code, such as an error code indicating that the node 111 is not available as a parent for the node 113. The response with the error code may be transmitted at step 712 based on the comparison of the rankings performed at step 710. In some cases, transmitting an error code in response to a neighbor-discovery message received from a node having a higher-ranked reliability may prevent a loop from forming in the RPL network 100, such as a loop between the relatively high-reliability node 113 and the relatively low-reliability node 111.

At step 730, the node 111 may receive a neighbor-discovery message from the node 112. The neighbor-discovery message may include a ranking of the node 112, such as the example ranking of 34 indicated for the node 112 in Table 2.

At step 732, the node 111 may compare its own ranking to the ranking received in regards to step 730. For example, the node 111 may compare the numeric value of 20 to the numeric value of 34. In addition, the node 111 may determine that the node 112 has a lower reliability as compared to node 111, based on respective rankings of the nodes 112 and 111 (e.g., a ranking of 34 indicates a lower reliability as compared to a ranking of 20).

At step 734, the node 111 may transmit to the node 112 a response to the neighbor-discovery message received at step 730. The response transmitted at step 734 may indicate an availability of the node 111 as a parent node for the node 112. The response indicating the availability may be transmitted based on the comparison of the rankings performed at step 732.

In some cases, a neighbor relationship is established based on a comparison of node rankings. At step 736 for example, the node 112 may establish a neighbor relationship with respect to the node 111, responsive to the indicated availability at step 734. The neighbor relationship established at step 736 may indicate a parent status of node 111 and a child status of node 112.

In some cases, transmitting an error code in response to a neighbor-discovery message received from a node having a higher-ranked reliability may prevent a loop from forming in the RPL network 100, such as a loop between a node with a relatively higher reliability and a node with a relatively lower reliability. In addition, transmitting the error code in a response to the higher-reliability node may prevent a loop from forming between more than two nodes, such as between a parent node, a child of the parent node, and a child of the child node (e.g., a loop between a "grandparent" node and a "grandchild" node). For example, the node 111 may transmit a neighbor-discovery message to node 115 that is a child of node 112, as described in regards to FIG. 1b. Node 115 does not have a parent-child relationship with node 111 (according to the example depicted in FIG. 1b). If the node 111 were to establish a parent relationship with node 115, a three-node loop may be formed, where node 111 would be the parent of node 112, node 112 would be the parent of node 115, and node 115 would be the parent of node 111. In the RPL network 100, however, the node 115 determines that node 111 has a relatively higher reliability based on a comparison of the rankings of nodes 111 and 115. The node 115 transmits a response that includes an error code, and the node 111 establishes a parent relationship with an additional node, such as with node 114. Therefore, responding to a neighbor-discovery message based on a comparison of node rankings may prevent formation of loops in the RPL network 100.

In some implementations, a node in an RPL network may adjust its own ranking, such as an adjustment based on whether the node has a parent in the RPL network. In some cases, an adjustment to a ranking includes a process for determining an infinite ranking (e.g., infinite unreliability), such as an RPL poisoning process described by the standard RFC 6550 for "RPL: IPv6 Routing Protocol for Low-Power and Lossy Networks." For example, if the RPL network 100 implements RPL poisoning, the node 113 may adjust its ranking to reflect a very poor reliability, such as a ranking that is interpreted by other nodes as infinite. Subsequent to receiving a response with an error code, the node 113 may establish a parent relationship with another node, such as node 111, based on the adjusted ranking. For example, an additional comparison of the ranking of the node 111 with the adjusted ranking of the node 113 (e.g., a ranking of 20 compared to an infinite ranking) indicates that the adjusted node 113 has a lesser reliability as compared to the node 111. In addition, the node 111 may provide a response indicating that it is available as a parent to the node 113, based on the additional comparison.

Figure 8:
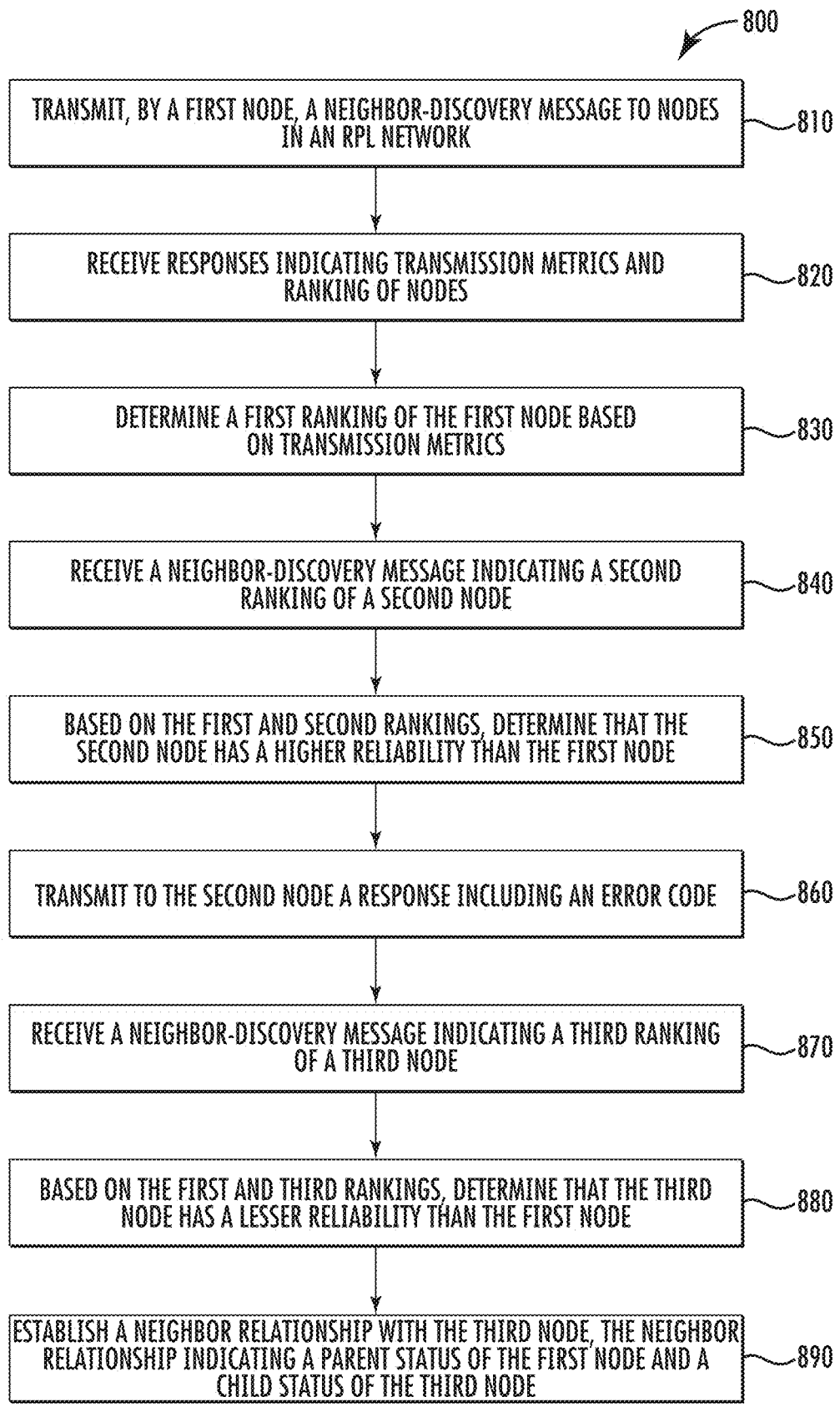
FIG. 8 is a flow chart depicting an example of a process for avoiding formation of loops in an RPL network based on a comparison of node rankings, according to certain implementations.

FIG. 8 is a flow chart depicting an example of a process 800 for preventing loop formation based on a comparison of node rankings. In some implementations, such as described in regards to FIGS. 1-7, a computing device configured as a node in an RPL network implements operations described in FIG. 8, by executing suitable program code. For illustrative purposes, the process 800 is described with reference to the examples depicted in FIGS. 1-7. Other implementations, however, are possible.

At block 810, the process 800 involves transmitting a neighbor-discovery message in an RPL network. The neighbor-discovery message may be transmitted by a first node in the RPL network, such as the node 111 in the RPL network 100. In addition, the neighbor-discovery message may be transmitted to additional nodes in the RPL network, such as to one or more of nodes 112-119. The neighbor-discovery message may be transmitted as a multicast message, or indicated as not available for retransmission.

At block 820, the process 800 involves receiving, by the first node, responses from one or more additional nodes in the RPL network. Each response may indicate a ranking of the respective responding node. In addition, each response may indicate transmission metrics of the respective responding node, such as transmission metrics describing a reliability of a communication path for each respective node in the RPL network. For example, node 111 may receive responses from one or more of nodes 112, 113, or 114, indicating respective transmission metrics. The transmission metrics may indicate a reliability with which the nodes 112, 113, or 114 transmit or route messages to the root node 110.

At block 830, the process 800 involves determining, by the node, a first ranking of the first node. The first ranking may indicate a reliability of the first node's communication path, such as a communication path between the first node and a root node of the RPL network. For example, the node 111 may determine a ranking for itself that indicates a reliability with which node 111 transmits or routes messages to the root node 110. In some implementations, the first ranking may be determined based, at least in part, on the transmission metrics received in regards to block 820. For example, the node 111 may determine a ranking for itself based, in part, on transmission metrics of nodes that may route messages from node 111 to the root node 110.

At block 840, the process 800 involves receiving, by the first node, a second neighbor-discovery message from a second node in the RPL network. The second neighbor-discovery message may indicate a second ranking of the second node. For example, the node 111 may receive from node 113 a neighbor-discovery message indicating a ranking of node 113, such as in regards to step 708.

At block 850, the process 800 involves determining, by the first node, that the second node has a higher reliability than the first node. The determination may be based on the first ranking and second ranking, such as based on a comparison of values indicated by the rankings. For example, the node 111 may compare its own ranking to the ranking of node 113 in regards to step 710, such as by performing a numeric comparison of the values of the rankings. Based on the comparison, the node 111 may determine that the node 113 has a higher reliability.

At block 860, the process 800 involves transmitting, by the first node and to the second node, a response to the second neighbor-discovery message. The response may include an error code, such as an error code indicating that the first node is not available as a parent for the second node. In regards to step 712 for instance, node 111 may transmit to node 113 a response with an error code that indicates node 111 is not available as a parent for node 113.

At block 870, the process 800 involves receiving, by the first node, a third neighbor-discovery message from a third node in the RPL network. The third neighbor-discovery message may indicate a third ranking of the third node. For example, the node 111 may receive from node 112 a neighbor-discovery message indicating a ranking of node 112, such as in regards to step 730.

At block 880, the process 800 involves determining, by the first node, that the third node has a lower reliability than the first node. The determination may be based on the first ranking and third ranking, such as based on a comparison of values indicated by the rankings. For example, the node 111 may compare its own ranking to the ranking of node 112 in regards to step 732, such as by performing a numeric comparison of the ranking values. Based on the comparison, the node 111 may determine that the node 112 has a lower reliability.

At block 890, the process 800 involves transmitting, by the first node and to the third node, a response to the third neighbor-discovery message. The response may indicate that the first node is available as a parent for the third node. In some cases, the third node may establish a parent-child relationship based on the response to the third neighbor-discovery message. For example, responsive to a response indicating the availability of node 111, transmitted in regards to step 734, the node 112 may establish a neighbor relationship indicating a parent status of node 111 and a child status of node 112, such as at step 736.

Although the blocks 870, 880, and 890 are described in regards to blocks 810 through 860, other implementations are possible. For example, a node that transmits, based on a ranking comparison, a response indicating its availability as a parent, such as generally described in regards to blocks 870 through 890, may, but need not, perform another ranking comparison or transmit another response with an error code, such as generally described in regards to blocks 810 through 860.

In some cases, one or more operations described in relation to any of FIG. 3, 4, 6, or 8 may be performed in addition to, or in combination with, additional operations described in relation to another process describe in FIG. 3, 4, 6, or 8. For example, a node that withholds neighbor-detection messages in an RPL network (as generally described in regards to FIG. 3) may also modify a neighbor relationship with an additional node (as generally described in regards to FIG. 4). In addition, a node that transmits a response to a neighbor-discovery message based on a rankings comparison (as generally described in regards to FIG. 8) may also transmit a response to a neighbor-discovery message based on a parent-child status (as generally described in regards to FIG. 6). Additional implementations including additional combinations of the described operations are possible.

Example Node Configuration

Figure 9:
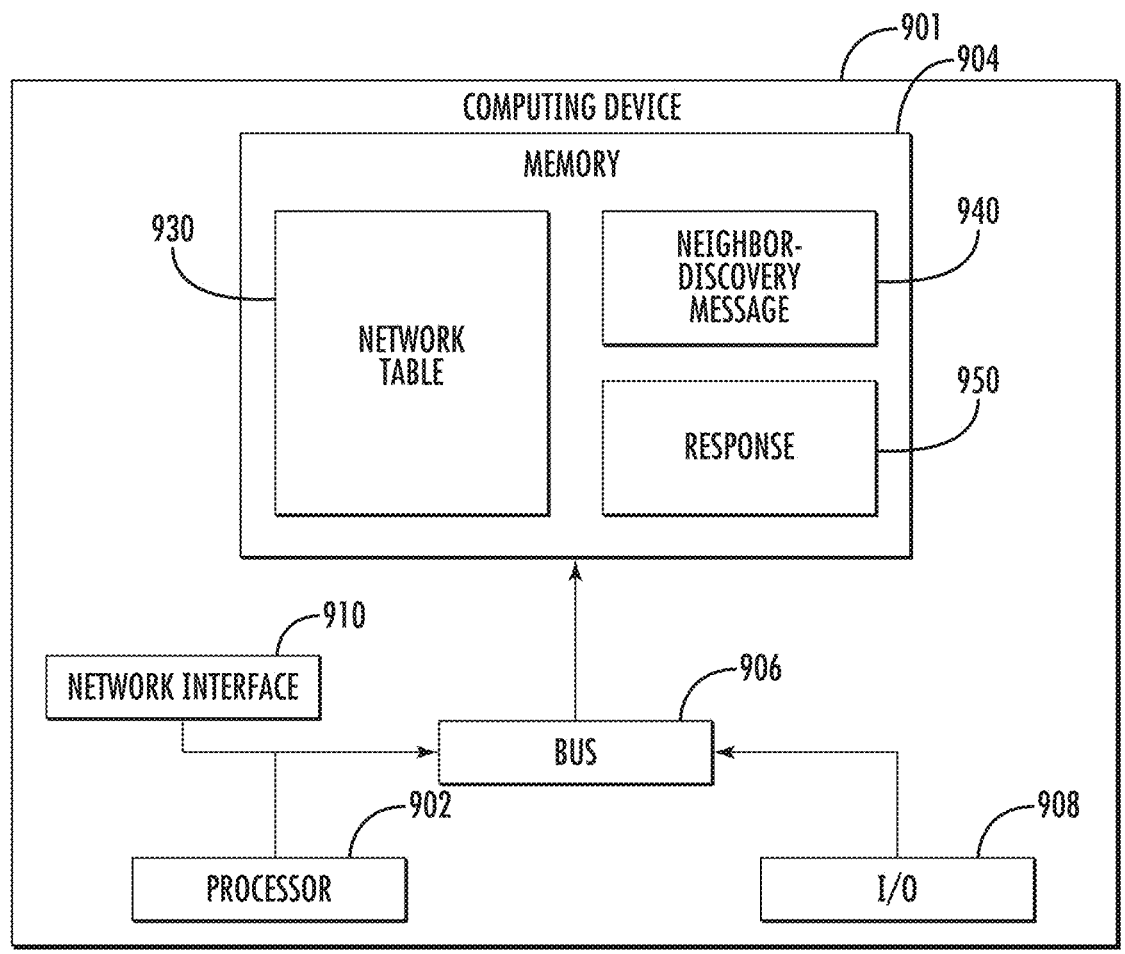
FIG. 9 is a block diagram depicting an example of a computing device configured to operate as a node in an RPL network, according to certain implementations.

Any suitable computing system or group of computing systems can be used for performing the operations described herein. For example, FIG. 9 is a block diagram depicting a computing device 901 that is configured to operate as a node in an RPL network, such as the RPL network 100, according to certain implementations.

The depicted example of the computing device 901 includes one or more processors 902 communicatively coupled to one or more memory devices 904. The processor 902 executes computer-executable program code or accesses information stored in the memory device 904. Examples of processor 902 include a microprocessor, an application-specific integrated circuit ("ASIC"), a field-programmable gate array ("FPGA"), or other suitable processing device. The processor 902 can include any number of processing devices, including one.

The memory device 904 includes any suitable non-transitory computer-readable medium for storing a network table 930, a neighbor-discovery message 940, a response 950, and other received or determined values or data objects. The network table 930 may indicate, for example, information about additional nodes in the RPL network 100, such as rankings, response times, routes, neighbor relationships, parent-child status, or other suitable information. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing device 901 may also include a number of external or internal devices such as input or output devices. For example, the computing device 901 is shown with an input/output ("I/O") interface 908 that can receive input from input devices or provide output to output devices. A bus 906 can also be included in the computing device 901. The bus 906 can communicatively couple one or more components of the computing device 901.

The computing device 901 executes program code that configures the processor 902 to perform one or more of the operations described above with respect to FIGS. 1-8. The program code includes operations related to, for example, one or more of the network table 930, the neighbor-discovery message 940, the response 950, or other suitable applications or memory structures that perform one or more operations described herein. The program code may be resident in the memory device 904 or any suitable computer-readable medium and may be executed by the processor 902 or any other suitable processor. In some implementations, the program code described above, the network table 930, the neighbor-discovery message 940, and the response 950 are stored in the memory device 904, as depicted in FIG. 9.

The computing device 901 depicted in FIG. 9 also includes at least one network interface 910. The network interface 910 includes any device or group of devices suitable for establishing a wired or wireless data connection to one or more of the additional nodes in the RPL network 100. Non-limiting examples of the network interface 910 include a Wi-Fi modem, a Bluetooth modem, a mobile data modem, an Ethernet network adapter, and/or the like. The computing device 901 is able to communicate with the one or more additional nodes in the RPL network 100 using the network interface 910.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific implementations thereof, it will be appreciated that those skilled in the art, upon attaining an understanding of the foregoing, may readily produce alterations to, variations of, and equivalents to such implementations. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A system for establishing neighbor relationships in a computer network using an IPv6 routing protocol for low-power and lossy networks ("RPL network"), the system including:
    a first node included in the RPL network, wherein the first node stores information about each node in the RPL network having a direct communication path with the first node in a table, wherein the first node is capable of communicating with each node in the RPL network having the direct communication path with the first node without routing through another node in the RPL network, the first node having a first neighbor relationship with respect to a second node included in the RPL network and a second neighbor relationship with respect to a third node included in the RPL network, wherein the first neighbor relationship indicates a parent status of the first node and a child status of the second node and the second neighbor relationship indicates a child status of the first node and a parent status of the third node, wherein a first table entry in the table describes the first neighbor relationship, and a second table entry in the table describes the second neighbor relationship, wherein each of the first node, the second node, and the third node is a non-root node in the RPL network,
    wherein the first node includes a processor that is configured to perform operations comprising:
        receiving, from the third node having the parent status, a first neighbor-discovery multicast message indicated as not available for retransmission to an additional node in the RPL network, wherein the first neighbor-discovery multicast message includes a first error code indicating that the third node does not have a parent, wherein the first neighbor-discovery multicast message indicates a requested modification to the second neighbor relationship, the requested modification describing (i) a revised parent status of the first node with respect to the third node and (ii) a revised child status of the third node with respect to the first node;
        determining, responsive to receiving the first neighbor-discovery multicast message and based on the second table entry that describes the second neighbor relationship, that the third node has the parent status with respect to the first node;
        responsive to determining that the third node has the parent status with respect to the first node, transmitting to the third node a first response to the first neighbor-discovery multicast message, the first response including a second error code, wherein the second error code indicates that the requested modification is not available;
        responsive to determining a lost connection with the third node, transmitting, by the first node, a second neighbor-discovery message to the second node, wherein the second neighbor-discovery message indicates a requested modification to the first neighbor relationship, the requested modification describing (i) a revised parent status of the second node with respect to the first node and (ii) a revised child status of the first node with respect to the second node;
        receiving, by the first node and from the second node, a second response to the second neighbor-discovery message, the second response including the second error code;
        determining, responsive to receiving the second error code from the second node, a lifetime registration counter associated with the second node and transmitting no additional neighbor-discovery messages to the second node during a time duration of the lifetime registration counter; and
        responsive to the second response including the second error code, establishing, by the first node, a third neighbor relationship with respect to a fourth node included in the RPL network, wherein the third neighbor relationship indicates a child status of the first node and a parent status of the fourth node.

2. The system of claim 1, the processor further configured for:
    transmitting, responsive to receiving the second error code from the second node, a deregistration message to the second node, wherein the deregistration message indicates a revocation of the child status of the second node; and
    subsequent to sending the deregistration message, transmitting an additional neighbor-discovery message to the second node.

3. The system of claim 1, wherein determining the lost connection includes:

transmitting a third neighbor-discovery message to the third node; and determining an expiration of a timeout threshold prior to receiving a third response to the third neighbor-discovery message.

4. The system of claim 1, wherein the second error code is a code indicating a status of a memory cache.

5. The system of claim 1, wherein the second error code is a code indicating an absence of a network route.

6. The system of claim 1, wherein the first neighbor-discovery multicast message indicates a ranking of the third node.

\* \* \* \* \*